June 14, 1927.
O. B. WOODROW
1,632,261
ADJUSTABLE SUPPORT FOR ELECTRIC MOTORS
Filed Oct. 15, 1924
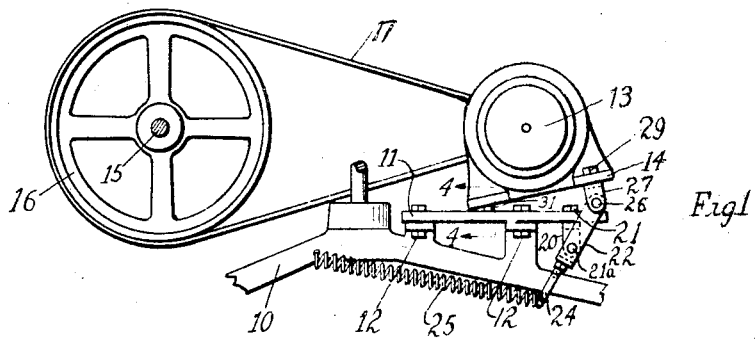
Fig.1
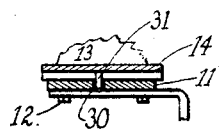
Fig.4
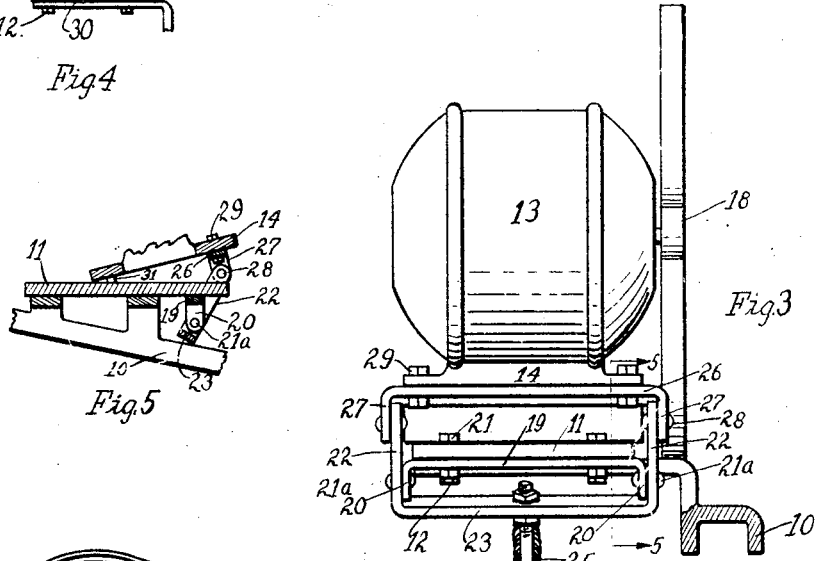
Fig.5
Fig.3
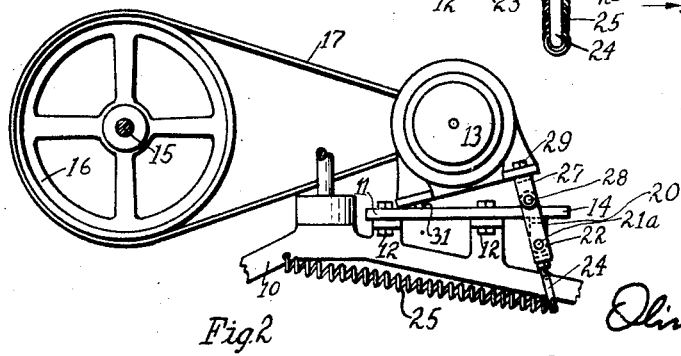
Fig.2
Inventor
Oliver B Woodrow
by Irving & Hager, Attys.

Patented June 14, 1927.

1,632,261

UNITED STATES PATENT OFFICE.

OLIVER B. WOODROW, OF NEWTON, IOWA.

ADJUSTABLE SUPPORT FOR ELECTRIC MOTORS.

Application filed October 15, 1924. Serial No. 743,765.

The object of my invention is to provide a supporting means of simple, durable and inexpensive construction especially designed to receive and support an electric motor provided with a pulley and designed to be used with a belt drive for operating mechanisms, such for instance as washing machines.

More specifically it is my object to provide a support of this character which will automatically maintain a certain predetermined tension on the belt drive as required for efficient operation of the driven mechanism, and to automatically compensate for the stretch of the belt during its use; and in this connection it is my object to provide a support which will automatically move the motor in a substantially straight line away from the driven pulley, and at the same time always maintain the motor pulley shaft in parallelism with the driven pulley shaft, whereby approximately a uniform tension is applied to the belt throughout the entire limit of movement of the motor relative to the driven shaft, and whereby the belt is constantly maintained centered relative to both the driving and driven pulleys to prevent wear upon the edges of the belt.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of a motor support embodying my invention with a motor mounted thereon and a driven pulley adjacent thereto and connected to the motor pulley by a belt.

Figure 2 shows a similar view with the motor at its limit of movement toward the driven pulley.

Figure 3 shows an enlarged detail end view of my improved motor support with a motor thereon and a pulley applied to the motor shaft and a belt on the pulley.

Figure 4 shows an enlarged, detail, sectional view on the line 4—4 of Figure 1; and Figure 5 shows a detail sectional view on the line 5—5 of Figure 3.

Referring to the accompanying drawings, I have used the reference numeral 10 to indicate a stationary support, such for instance as the frame of a washing machine. Fixed to this frame is a flat, substantially horizontally arranged, motor base plate 11 firmly secured to the frame by bolts 12.

The electric motor is indicated generally by the reference numeral 13 and is provided with a base 14 having suitable openings therein to receive bolts whereby it may be clamped to a base plate. The reference numeral 15 indicates a driven shaft on which there is a pulley 16, and a belt 17 passes around this pulley 16 and also around the pulley 18 on the motor shaft.

All of the parts just described are of the ordinary construction and may be readily and easily obtained in almost any locality.

My improved device comprises essentially a supporting bracket formed of a metal bar 19 having its ends bent downwardly at 20 and its central portion secured by bolts 21 to the base plate 11 near the end thereof away from the driven pulley 16. Pivoted to the downwardly extended ends 20 by means of pivot pins 21ª are the levers 22, which are also preferably formed of a single piece of strap metal connected together by the body portion 23 which extends below the base plate 11. At the central portion of the part 23 is a downwardly extended arm 24 to which the tension spring 25 is attached, the other end of the spring being attached in any suitable ordinary manner to a portion of the frame 10, as shown in Figure 1.

Fixed to the under surface of the motor base 14 is a metal bar 26 having downwardly extended ends 27 which are connected to the upper ends of the levers 22 by the pivot pins 28. This bar 26 is securely and firmly bolted to the motor base 14 by the bolts 29.

Obviously my improved motor supporting device comprising the bars 19, 23 and 26 may be readily and easily assembled as a unit and connected together by the pivot pins 21ª and 28, and then this unit may readily and quickly be applied to a motor base plate 11 by means of the bolts 21 and to the motor base by means of the bolts 29.

I preferably provide in the base plate 11 a slot 30, shown in Figure 4, and extended in a direction parallel with the belt 17, and in the motor base 14 I preferably provide a pin 31 at the side thereof adjacent to the driven pulley. This pin rides in the slot 30 during adjustment of the motor toward and from the driven pulley and serves to prevent any such movement of the motor as would tend to bring the motor shaft out of parallelism with the shaft 15. In some instances, however, I dispense with the use of this guide pin, as the remainder of the device functions sufficiently well under ordinary conditions to avoid the necessity for the guide pin.

In practice, it is obvious that my improved device is of very simple and inexpensive construction, as it comprises essentially only three pieces of metal bar connected by pivot pins, and these may be applied to a base plate and to a motor base by means of bolts such as are commonly used to connect the motor base with the base plate. The device is preferably positioned relative to the driven shaft so that with a belt of normal length the motor will assume the position shown in Figure 2 when the belt is first applied, that is to say, to near its limit of movement toward the shaft 15. Then as the motor is being used, and when the belt stretches, the motor is gradually moved by the spring 25 in substantially a straight line away from the shaft 15, and this straight line movement continues until the motor has traveled its maximum distance away from the shaft 15, and when that limit of movement is reached, it is then necessary to shorten the belt or apply a new one. When the motor is in any position of its adjustment, the spring 25 provides a proper tension upon the belt at all times.

In practice, I have found that with my improvement the motor is firmly supported against any lateral movement, such for instance as would tend to bring the motor shaft and the driven shaft out of parallelism, and at the same time there is no chattering or vibration of the motor, even under adverse conditions, and yet there is sufficient yield to the spring 25 so that if the motor should be started when the shaft 15 is held immovable, then the belt would slip relative to the motor shaft and the motor would be saved from injury.

I claim as my invention:

1. In a device of the class described, the combination of a stationary support, a base plate fixed in substantially horizontal position to the stationary support, a motor resting with one edge upon said base and having a driving pulley connected therewith, a belt passed around said pulley, a substantially U-shaped lever fulcrumed to a stationary support below the base and extended upwardly therefrom, means for pivotally connecting the upwardly extended ends of said U-shaped lever to the motor on the side opposite from the side thereof which engages the base, and a spring fixed to the lower end of the lever and to the stationary support tending to move the lever to position for causing the motor to swing to position resting flat upon said base.

2. The combination with an electric motor and a motor base plate, of a substantially U-shaped lever, a fulcrum bar fixed to the base plate and having downwardly extended ends pivoted to the sides of said lever, a bar fixed to the motor and having downwardly extended ends pivoted to the upper ends of the U-shaped lever, an arm extended downwardly from the central portion of the U-shaped lever, and a spring applied to said arm, substantially as and for the purposes stated.

OLIVER B. WOODROW.